(12) United States Patent  (10) Patent No.: US 9,022,186 B2
Murakami et al.  (45) Date of Patent: May 5, 2015

(54) DAMPING FORCE GENERATOR FOR HYDRAULIC SHOCK ABSORBER

(71) Applicant: Showa Corporation, Gyoda-shi, Saitama (JP)

(72) Inventors: Yosuke Murakami, Fukuroi (JP); Kazuhiro Miwa, Fukuroi (JP)

(73) Assignee: Showa Corporation, Saitama (JP)

( * ) Notice: Subject to any disclaimer, the term of this patent is extended or adjusted under 35 U.S.C. 154(b) by 104 days.

(21) Appl. No.: 13/673,443

(22) Filed: Nov. 9, 2012

(65) Prior Publication Data

US 2013/0257011 A1  Oct. 3, 2013

(30) Foreign Application Priority Data

Mar. 27, 2012 (JP) ................. 2012-072175

(51) Int. Cl.
  *F16F 9/18* (2006.01)
  *B62K 25/08* (2006.01)
  *F16F 9/348* (2006.01)

(52) U.S. Cl.
  CPC . *F16F 9/18* (2013.01); *B62K 25/08* (2013.01); *F16F 9/3485* (2013.01); *F16F 9/182* (2013.01)

(58) Field of Classification Search
  CPC ................. F16F 9/32; F16F 9/18; F16F 9/34; F16F 9/341; F16F 9/3485
  USPC ............ 188/266, 313, 322.15, 322.18, 282.6, 188/283, 322.17, 282.5, 322.13
  IPC ....................................... F16F 9/32,9/34, 9/348
  See application file for complete search history.

(56) References Cited

U.S. PATENT DOCUMENTS

| | | | | |
|---|---|---|---|---|
| 4,298,102 A | * | 11/1981 | Nishikawa et al. | 188/282.6 |
| 5,404,973 A | * | 4/1995 | Katoh et al. | 188/282.1 |
| 7,766,137 B2 | * | 8/2010 | De Kock | 188/322.15 |

FOREIGN PATENT DOCUMENTS

| | | | | |
|---|---|---|---|---|
| JP | 58211038 A | * | 12/1983 | F16F 9/348 |
| JP | 08093824 A | * | 4/1996 | F16F 9/32 |

* cited by examiner

*Primary Examiner* — Anna Momper
*Assistant Examiner* — San Aung
(74) *Attorney, Agent, or Firm* — Babcock IP, PLLC

(57) ABSTRACT

A damping force generator for a hydraulic shock absorber featuring an increased deflection (bending) characteristic of a damping valve to widen the adjustable range of a damping force. In a damping force generator (70) for a hydraulic shock absorber, the damping valve (80) undergoes deflections with boundaries (71C) between secured portions (71A) and recessed portions (71B) of the valve seat (71) as supporting points K, and inner and outer peripheries of the damping valve (80) are disposed on an outside of line segments L each connecting two circumferentially adjacent supporting points K, K of the valve seat (71).

6 Claims, 13 Drawing Sheets

(A)

(B)

(C)

(A)

(B)

(A)

(B)

(A)

(B)

(C)

DAMPING FORCE GENERATOR FOR HYDRAULIC SHOCK ABSORBER

CROSS-REFERENCES TO RELATED APPLICATIONS

This application claims the benefit of Japan Patent Application No. 2012-072175 filed on Mar. 27, 2012 with the Japanese Patent Office, the entire contents of which are hereby incorporated by reference in the entirety.

TECHNICAL FIELD

The present invention relates to a damping force generator for a hydraulic shock absorber suited for use in a two-wheel vehicle front fork and the like.

BACKGROUND

A damping force generator for a hydraulic shock absorber as disclosed in Japanese Examined Utility Model Application Publication No. H02-47790 (Patent Document 1) is structured as follows: A vehicle body side inner tube is slidably inserted in a wheel side outer tube. A hollow pipe provided with a bulkhead portion, which is in slidable contact with the inner periphery of the inner tube, is installed upright on the bottom of the outer tube. An oil chamber, in which a piston provided within the inner periphery of the inner tube advances and retracts, is provided around the hollow pipe. The oil chamber is comparted by the piston into an upper oil chamber located above the piston and a lower oil chamber located below the piston. The interior of the hollow tube is defined as an oil reservoir chamber that reaches the upper part of the inner tube, and an air chamber is located above the oil reservoir chamber. An annular interspace chamber is provided between the outer tube and the inner tube, located between a slide guide secured to the inner periphery of the outer tube and a slide guide secured to the outer periphery of the inner tube. Holes communicating this annular interspace chamber with the oil chamber around the hollow pipe are formed in the inner tube. A damping force generator is provided between the upper oil chamber and the lower oil chamber around the hollow pipe that allows the oil to flow into the upper oil chamber in the compression stroke and creates a passage resistance to the oil flowing out of the upper oil chamber in the extension stroke.

The damping force generator as described above is designed so that the outer periphery of the damping valve is secured to the piston on the inner tube side and an extension-stroke damping force is generated as a high pressure in the upper oil chamber which pushes open the damping valve by bending (causing a deflection in) the inner periphery thereof.

SUMMARY OF THE INVENTION

With the damping force generator for a hydraulic shock absorber as disclosed in Patent Document 1, the outer periphery of the damping valve is secured, and the damping valve is pushed open by bending the inner periphery thereof. The valve stiffness of the damping valve is high, and the amount of deflection is small. As a result, it is difficult to reduce the damping force of the damping valve with the result that the adjustable range of the damping force is small.

An object of the present invention is therefore to realize a wider adjustable range of damping force by increasing the amount of deflection (bending) of the damping valve for a damping force generator of a hydraulic shock absorber.

The present invention provides a damping force generator for a hydraulic shock absorber which includes a piston providing a partition between two oil chambers, a valve seat secured to the piston, a damping valve disposed on one side of the valve seat, and a check valve stacked on the damping valve such that a high pressure in one of the oil chambers pushes open the damping valve to generate a damping force and a high pressure in the other of the oil chambers pushes open the check valve. In this damping force generator, the ring-like valve seat has secured portions and recessed portions adjacent to each other along its circumference, and the secured portions, together with parts of a circumference of the annular-shaped damping valve seated thereon, are secured to the piston and the recessed portions are spaced apart from the other parts of a circumference of the damping valve. The damping valve undergoes deflections with boundaries between secured portions and recessed portions of the valve seat as supporting points, and inner and outer peripheries of the damping valve are disposed on an outside of line segments each connecting two circumferentially adjacent supporting points of the valve seat.

Further, the present invention provides a front fork which includes an outer tube mounted on a wheel side, an inner tube mounted on a vehicle body side and slidably inserted in the outer tube, a hollow pipe installed upright at a bottom inside the outer tube and having a bulkhead portion in slidable contact with an inner periphery of the inner tube, a piston provided inside an end portion of the inner tube, and an upper damping force generator disposed between the upper oil chamber and the lower oil chamber around the hollow pipe. The piston advances and retracts through an oil chamber provided around the hollow pipe and comparts the oil chamber into an upper oil chamber above it and a lower oil chamber below it. An interior of the hollow pipe defines an oil reservoir chamber that reaches to an upper part of the inner tube, and an air chamber is located above the oil reservoir chamber. An annular interspace chamber is located between the outer tube and the inner tube held between a slide guide secured to the inner periphery of the outer tube and a slide guide secured to the outer periphery of the inner tube. Holes are formed in the inner tube to communicate the annular interspace chamber with the oil chamber around the hollow pipe. The upper damping force generator allows an oil to flow into the upper oil chamber in the compression stroke and creates a passage resistance to the oil flowing out of the upper oil chamber in an extension stroke. The upper damping force generator includes a valve seat secured to the piston, an extension-stroke damping valve disposed on the upper oil chamber side of the valve seat, and a compression-stroke check valve stacked on the extension-stroke damping valve such that a high pressure in the upper oil chamber pushes open the extension-stroke damping valve to generate an extension-stroke damping force and a high pressure in the lower oil chamber pushes open the compression-stroke check valve. The ring-like valve seat has secured portions and recessed portions adjacent to each other along its circumference, and the secured portions, together with parts of the circumference of the annular-shaped extension-stroke damping valve seated thereon, are secured to the piston and the recessed portions are spaced apart from the other parts the of circumference of the extension-stroke damping valve. The extension-stroke damping valve undergoes deflections with boundaries between secured portions and recessed portions of the valve seat as supporting points, and inner and outer peripheries of the extension-stroke damping valve are disposed on an outside of line segments each connecting two circumferentially adjacent supporting points of the valve seat.

DESCRIPTION OF EMBODIMENTS (First Embodiment) (FIGS. 1 to 9)

Figure 1:
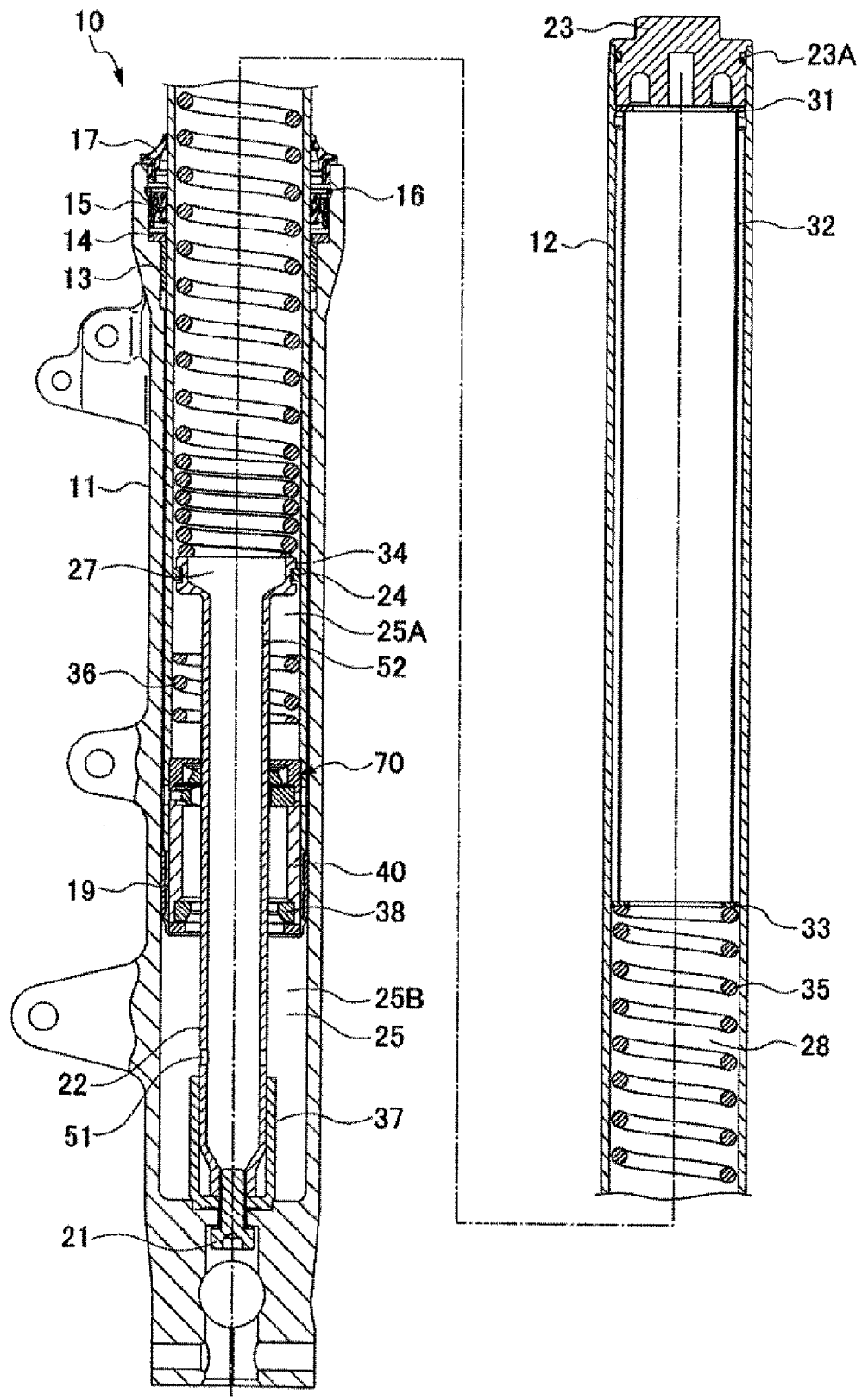
FIG. 1 is a cross-sectional view showing an entirety of a front fork according to a first embodiment.
Figure 2:
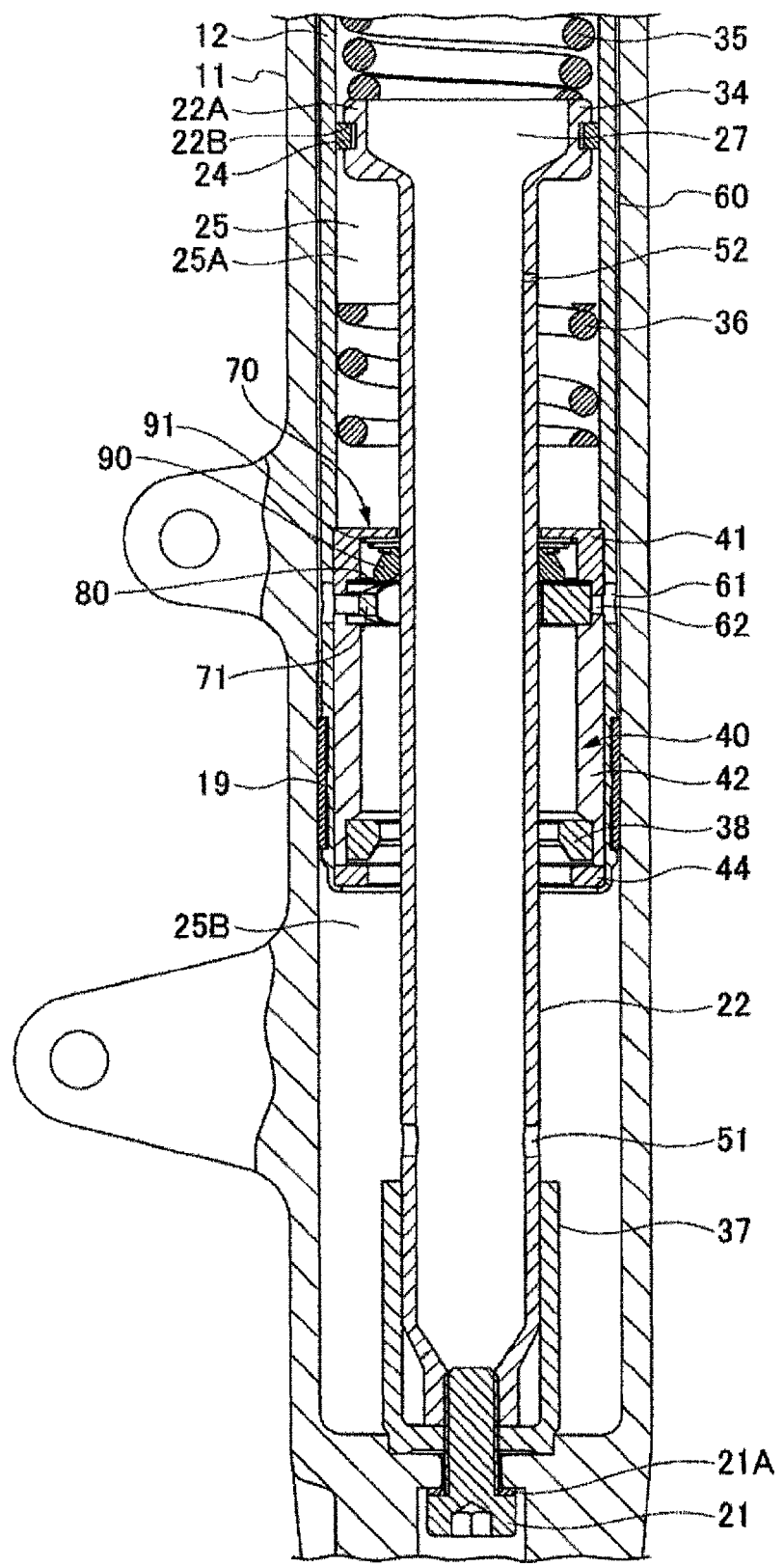
FIG. 2 is a cross-sectional view of the lower part of FIG. 1.
Figure 3:
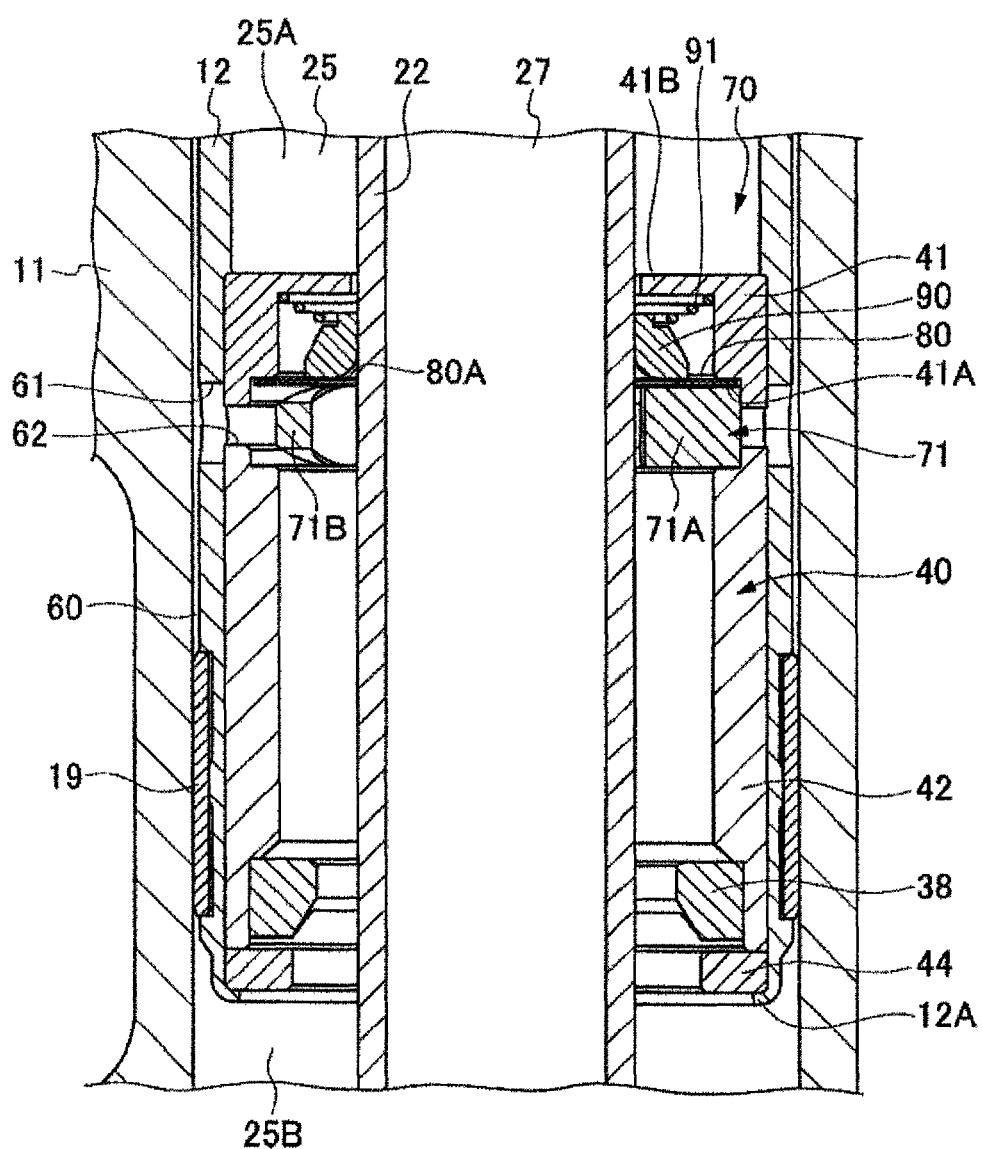
FIG. 3 is a cross-sectional view showing a damping force generator.

As shown in FIGS. 1 to 3, a front fork 10 (hydraulic shock absorber), which is used on a two-wheel vehicle or the like, has an outer tube 11 (wheel-side tube) having a closed end on the wheel side and an open end on the other side and an inner tube 12 (body-side tube) on the vehicle body side slidably inserted into the outer tube 11. Provided at the open end of the outer tube 11 where the inner tube 12 is inserted are a slide guide 13, a seal spacer 14, an oil seal 15, a stopper ring 16, and a dust seal 17. A slide guide 19 is attached to the lower end outer periphery of the inner tube 12, which is inserted into the outer tube 11.

A bolt 21 is inserted through a bottom of the outer tube 11 with a copper packing 21A fitted in between, and a hollow pipe 22 is installed upright secured by the bolt 21. The bolt 21 is screwed into a threaded inner periphery of a reduced diameter portion below a tapered lower end portion of the hollow pipe 22. At an upper end portion of the inner tube 12, a lower outer periphery of a cap bolt 23 is screwed thereinto with an O-ring 23A interposed in between.

An end surface of the cap bolt 23 facing an interior of the inner tube 12 supports a spring seat collar 32 and a spring seat plate 33 in a butted manner via a spring seat plate 31. A compression coil spring 35 is set between the spring seat plate 33 and a spring seat portion 34 which includes an upper end face of a widened-diameter bulkhead portion 22A provided at an upper end of the hollow pipe 22.

The above-mentioned bulkhead portion 22A is provided at the upper end of the hollow pipe 22, and a piston ring 24, which is in sliding contact with an inner periphery of the inner tube 12, is fitted in an annular groove 22B in an outer periphery of the bulkhead portion 22A. An oil chamber 25 to be discussed later is provided below the bulkhead portion 22A and around the hollow pipe 22.

A piston 40 is disposed inside an end portion (lower end) of the inner tube 12 inserted in the outer tube 11. The piston 40, which includes an annular upper piece 41 locked to a recessed inside diameter portion of the inner tube 12, a tubular lower piece 42 and a washer 44 fixed to the upper piece 41 by clinching a lower-end portion 12A of the inner tube 12, has an upper damping force generator 70 between the upper piece 41 and the lower piece 42. The upper damping force generator 70 will be described later.

The piston 40 in the end portion of the inner tube 12, which advances and retracts in the oil chamber 25 around the hollow pipe 22, comparts an oil chamber 25 into an upper part and a lower part. In other words, an upper oil chamber 25A is formed by the inner tube 12, the hollow pipe 22, the bulkhead portion 22A, and the piston 40, and a lower oil chamber 25B is formed by the outer tube 11 and the hollow pipe 22 below the piston 40.

An interior of the hollow pipe 22 is defined as an oil reservoir chamber 27 that reaches to an upper part of the inner tube 12, and with a hydraulic oil present in the oil reservoir chamber 27, a part above the oil reservoir chamber 27 becomes an air chamber 28. Also, formed in the hollow pipe 22 to communicate the oil chamber 25 around the hollow pipe 22 with the oil reservoir chamber 27 inside the hollow pipe 22 are hole-like volume compensation passages 51 that can compensate for a varying volume of the oil due to the advance and retraction of the inner tube 12 in the oil chamber 25 around the hollow pipe 22.

The hollow pipe 22 has an orifice 52 formed immediately below the bulkhead portion 22A thereof which leads a part of the oil in the upper oil chamber 25A, which has higher pressures in a extension stroke, into the oil reservoir chamber 27 inside the hollow pipe 22.

An annular interspace chamber 60 is provided in a gap between the outer tube 11 and the inner tube 12 between the slide guide 13 secured to the inner periphery of the outer tube 11 and the slide guide 19 secured to the outer periphery of the inner tube 12. Holes 61 are formed in a part of the inner tube 12 where the piston 40 is disposed, and at the same time a gap 62 is provided between the upper piece 41 and the piston 40, so that these holes 61 and the gap 62 communicate the annular interspace chamber 60 with the oil chamber 25 (upper oil chamber 25A, lower oil chamber 25B) around the hollow pipe 22. Accordingly, a lubrication of the slide guides 13, 19 and the volume compensation can be carried out with the hydraulic oil introduced in the annular interspace chamber 60.

Note that a rebound spring 36 to work at a maximum extension, which is a stroke end of an extension, is disposed between the upper piece 41 of the piston 40 placed in the inner tube 12 and the bulkhead portion 22A of the hollow pipe 22 to restrict a maximum extension stroke. Also, an oil lock piece 37 is held between the lower end portion of the hollow pipe 22 and the bottom of the outer tube 11, and an oil lock collar 38 provided on a lower end inner periphery of the lower piece 42 of the piston 40 to work at a maximum compression, which is a stroke end of a compression, applies pressure to the hydraulic oil around the oil lock piece 37 to restrict a maximum compression stroke.

Between the lower piece 42 and the washer 44 of the piston 40, the oil lock collar 38 is set in a vertically movable manner with a minute gap left along the lower piece 42. Near the maximum compression of the front fork 10, the oil lock collar 38 engages with the oil lock piece 37 provided on the side of the hollow pipe 22 with a minute gap left therebetween to absorb a shock at the maximum compression. Then, in the extension stroke from the maximum compression, the oil lock piece 37 moves apart downward, thereby opening an oil passage, which is the minute gap around the oil lock collar 38.

Hereinbelow, the above-mentioned upper damping force generator 70 will be described in detail.

As shown in FIGS. 1 to 3, the upper damping force generator 70 is disposed between the upper oil chamber 25A and the lower oil chamber 25B around the hollow pipe 22 (and the holes 61 formed in the inner tube 12 and communicating with the annular interspace chamber 60). The upper damping force generator 70 allows the oil to flow into the upper oil chamber 25A in a compression stroke and creates a passage resistance to the oil flowing out of the upper oil chamber 25A in the extension stroke.

Figure 4:
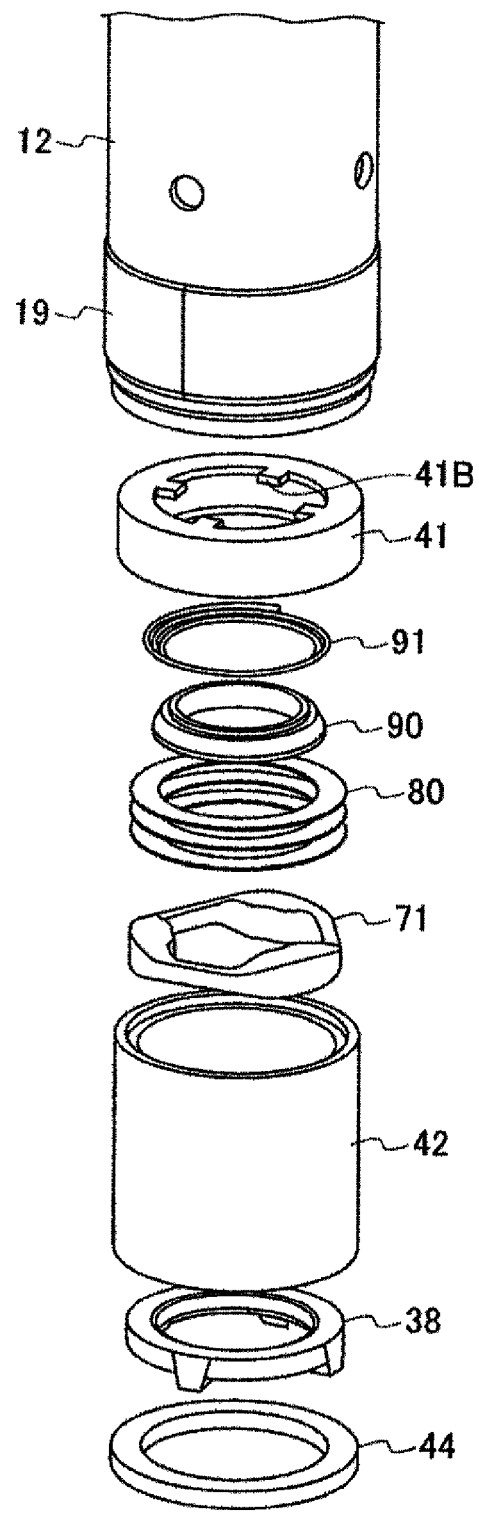
FIG. 4 is an exploded perspective view showing a damping force generator.

As shown in FIGS. 3 and 4, the upper damping force generator 70 has an extension-stroke damping valve 80 and a compression-stroke check valve 90 stacked in this order on an upper oil chamber 25A side of a valve seat 71 secured to the piston 40. The upper damping force generator 70 generates an extension-stroke damping force by pushing open the extension-stroke damping valve 80 under a high pressure in the upper oil chamber 25A in the extension stroke and pushes open the compression-stroke check valve 90 under a high pressure in the lower oil chamber 25B in the compression stroke.

Figure 5:
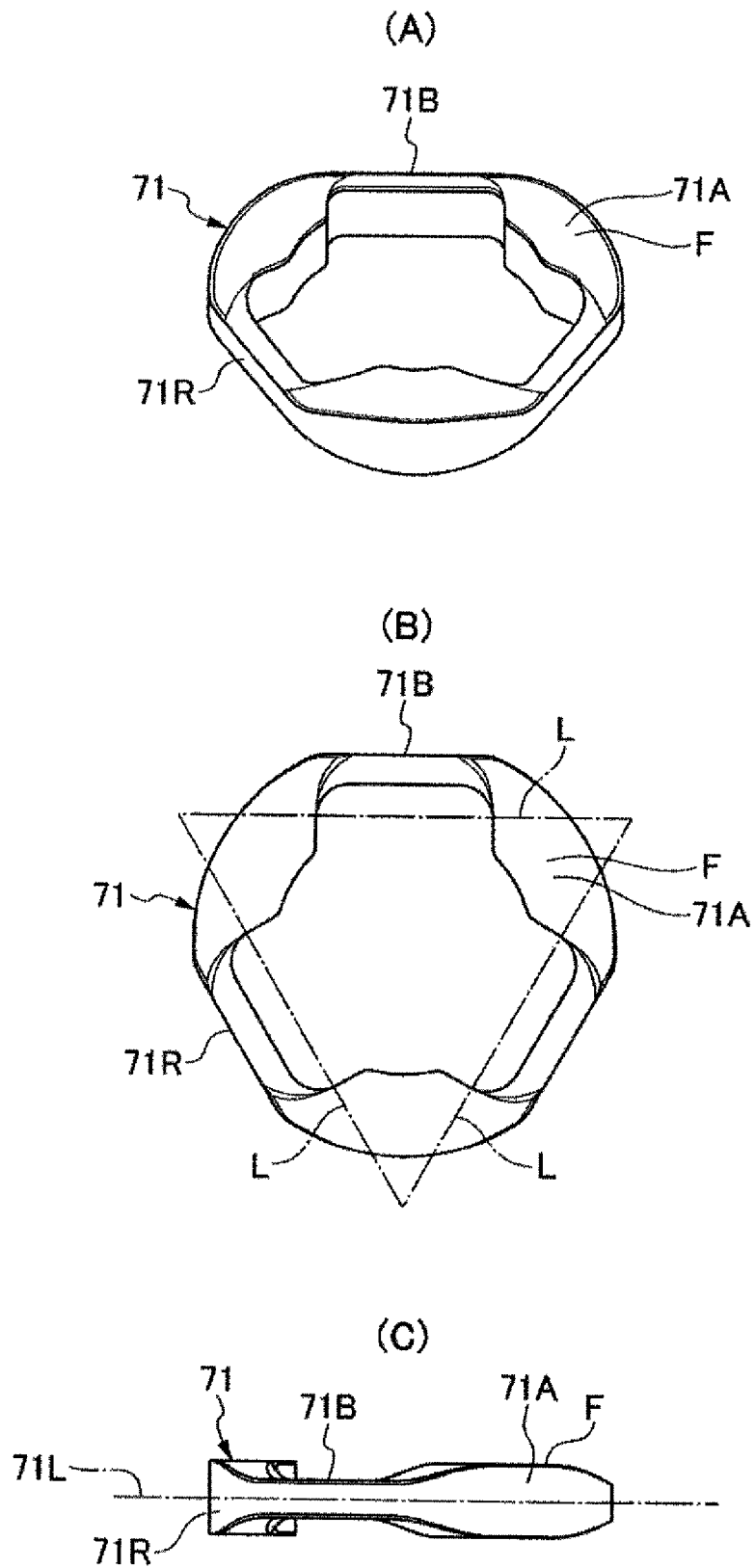
FIG. 5 shows a valve seat, A being a perspective view, B being a plan view, and C being a side view.

As shown in FIG. 5, the valve seat 71, comprising a ring-like member 71R, has one or more each of a secured portion 71A and a recessed portion 71B adjacent to each other along the circumference thereof. In this example, three each of the secured portion 71A and the recessed portion 71B are arranged alternately. The valve seat 71, embedded in the piston 40, is loosely inserted around the hollow pipe 22. Seated on the secured portions 71A are parts of a circumference of the annular-shaped extension-stroke damping valve 80, and the secured portions 71A, together with the parts of the extension-stroke damping valve 80, are sandwiched and secured between the upper piece 41 and the lower piece 42 of the piston 40. The recessed portions 71B are spaced apart from the other parts of the circumference of the extension-stroke damping valve 80.

Figure 6:
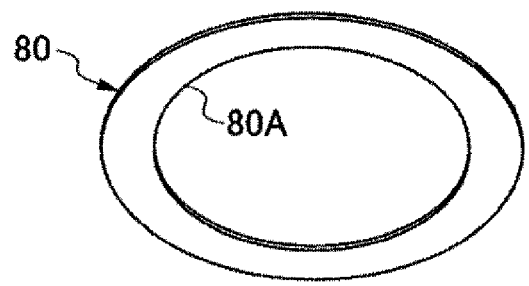
FIG. 6 shows a damping valve, A being a perspective view, B being a plan view, and C being a side view.
Figure 6:
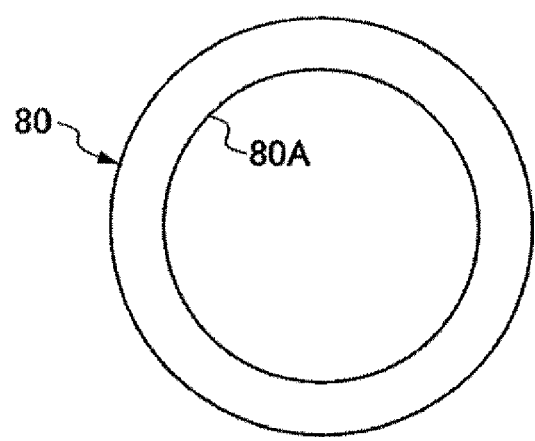
Figure 6:

The extension-stroke damping valve 80 includes a plurality of thin annular-shaped plates as shown in FIG. 6. They are stacked for use.

Figure 7:
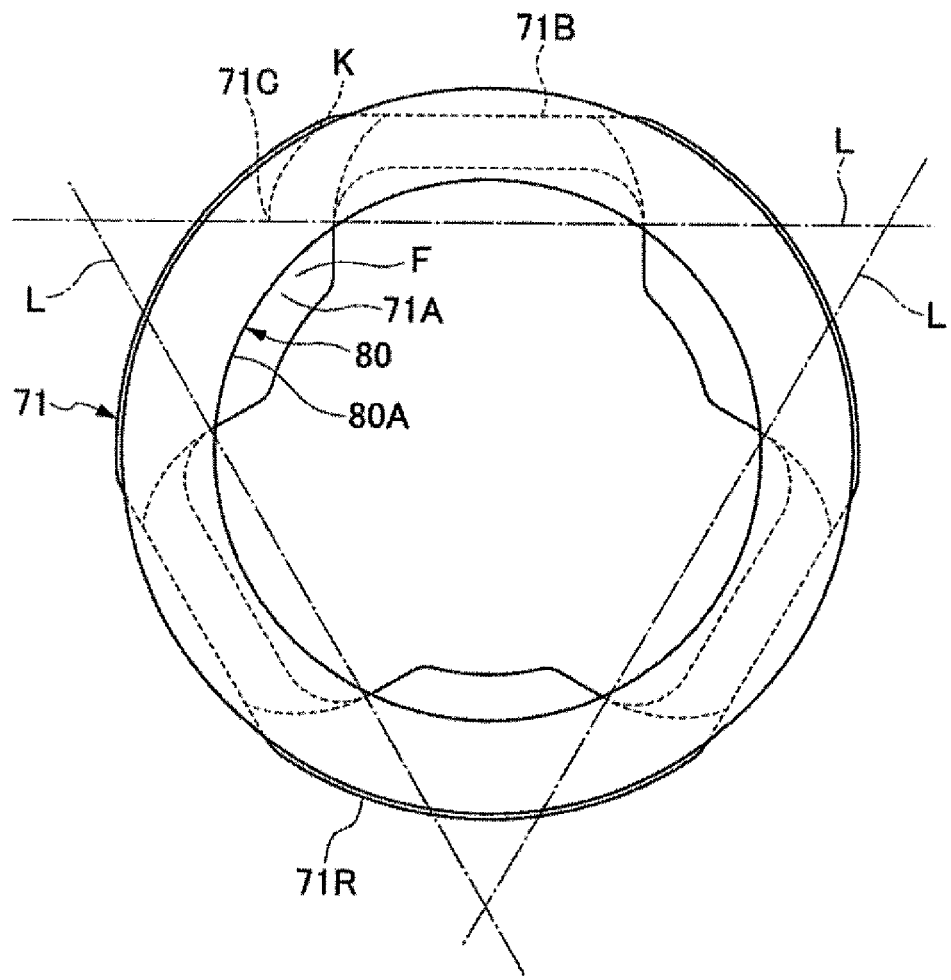
FIG. 7 shows a damping valve and a valve seat, A being a plan view and B being a side view.
Figure 7:
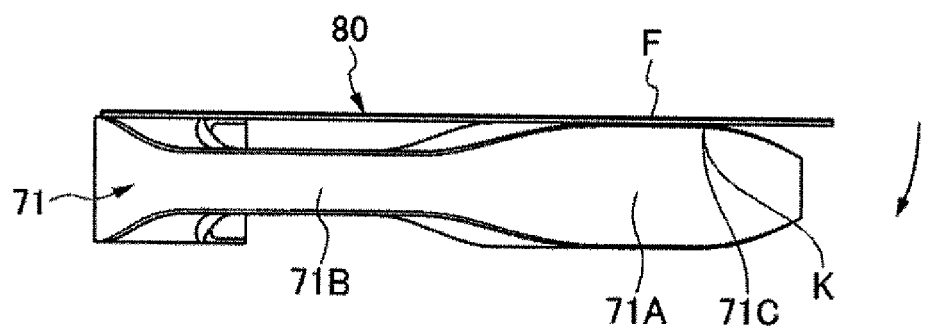
Figure 9:
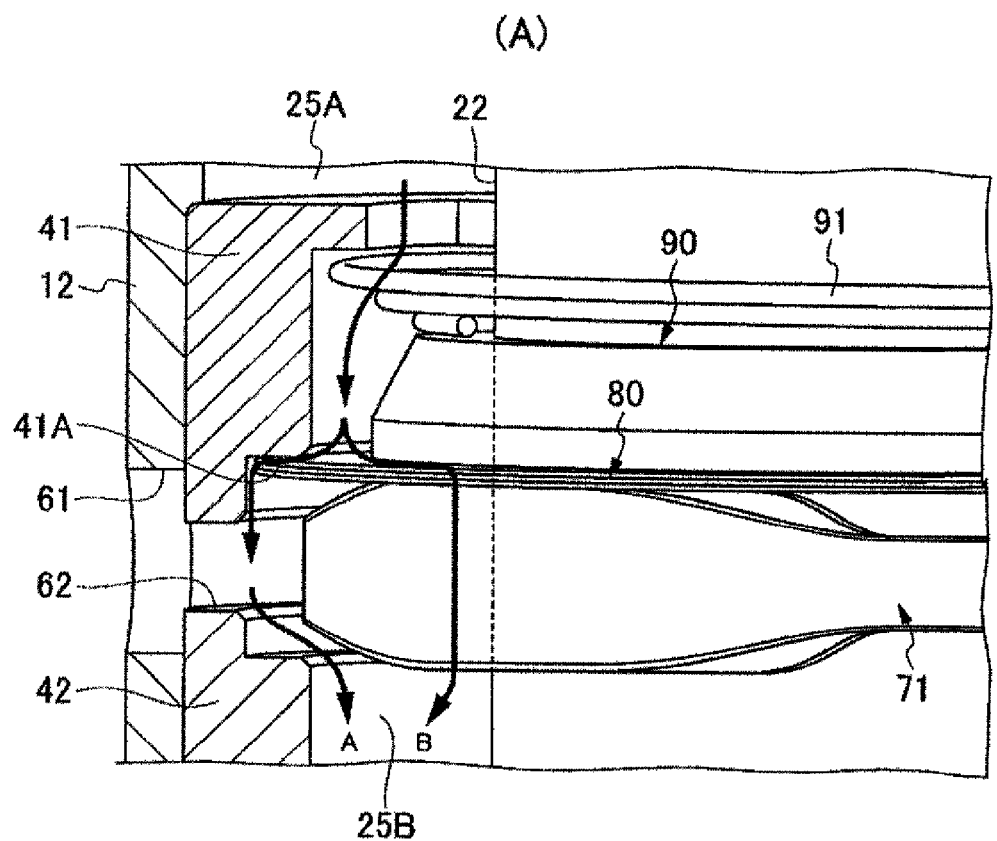
FIG. 9 shows a damping force generator, A being a schematic side view and B being a schematic perspective view.
Figure 9:
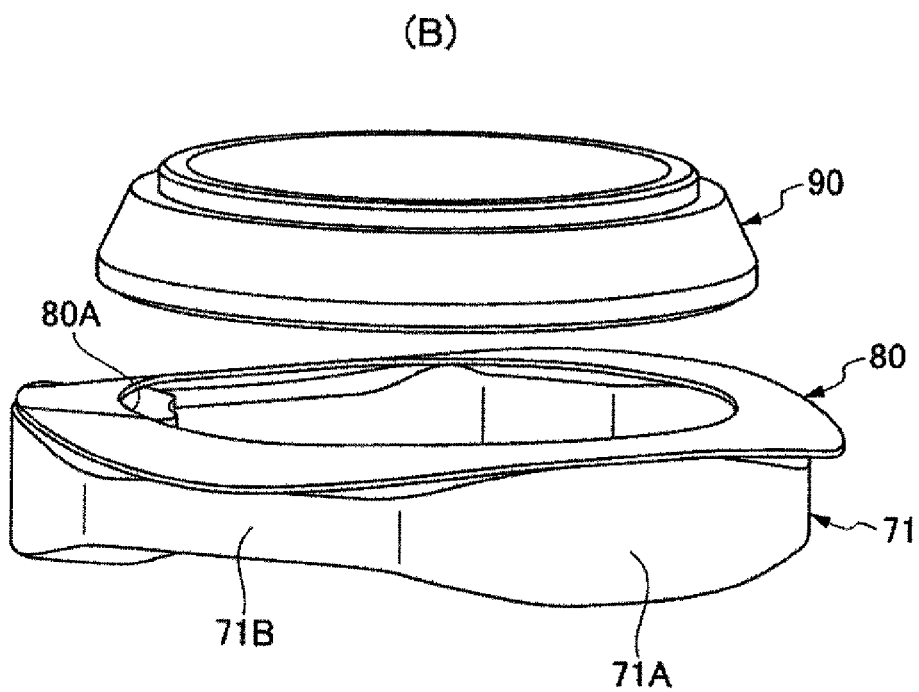

As shown in FIG. 7 and FIG. 9, the extension-stroke damping valve 80 is installed such that parts of the circumference of the outer periphery thereof, when they are sandwiched between the upper piece 41 and the lower piece 42 of the piston 40 together with the outer periphery of the secured portions 71A of the valve seat 71, are fastened to a stepped seating surface 41A of the upper piece 41. In this state, the other parts of circumference of the upper surface of the outer peripheral portion of the extension-stroke damping valve 80 can come into and out of contact with the stepped seating surface 41A of the upper piece 41. Also, the extension-stroke damping valve 80 forms an inner peripheral passage 80A around the hollow pipe 22. The valve seat 71 dimensioned so that an outside diameter of the secured portions 71A thereof is of the same diameter as an outer periphery of the extension-stroke damping valve 80 and an inside diameter of the secured portions 71A thereof extends inward from an inner periphery of the extension-stroke damping valve 80. Also, the valve seat 71 dimensioned so that an outside diameter of the recessed portions 71B thereof recedes inward from the outer periphery of the extension-stroke damping valve 80 and an inside diameter of the recessed portions 71B recedes outward from the inner periphery of the extension-stroke damping valve 80. In other words, as shown in FIG. 5, the valve seat 71 dimensioned so that the secured portions 71A are wide and the recessed portions 71B are narrow in a planar view, and the secured portions 71A are thick and the recessed portions 71B are thin in a lateral view.

Figure 8:
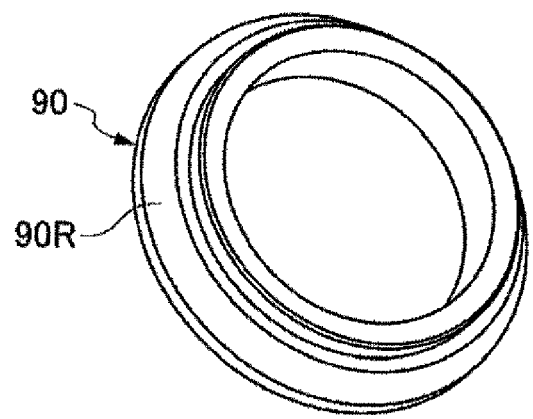
FIG. 8 shows a check valve, A being a perspective view and B being a side view.
Figure 8:
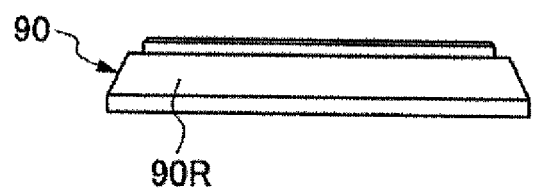

The compression-stroke check valve 90, as shown in FIG. 3 and FIG. 8, includes a ring-shaped member 90R slidably fitted around the hollow pipe 22. The compression-stroke check valve 90 is seated on an upper surface of the inner periphery of the extension-stroke damping valve 80 already set on the piston 40, pressed by a biasing force of a valve spring 91 backup-supported by an inner peripheral stopper 41B of the upper piece 41. The ring-shaped member 90R of the compression-stroke check valve 90, when seated on the upper surface of the inner periphery of the extension-stroke damping valve 80, blocks the inner peripheral passage 80A of the extension-stroke damping valve 80 to the upper oil chamber 25A.

The extension-stroke damping valve 80 generates an extension-stroke damping force as it is pushed open by a high pressure in the upper oil chamber 25A, deflects (bends) within boundaries 71C between secured portions 71A and recessed portions 71B of the valve seat 71 as supporting points K as shown in FIG. 7 and FIG. 9. Note that the whole of the extension-stroke damping valve 80, including the inner and outer peripheries thereof, is disposed on the outside of line segments each connecting two circumferentially adjacent supporting points K, K of the valve seat 71.

In this embodiment and other embodiments described later, the secured portions 71A of the valve seat 71 has flat surfaces F (see FIG. 5, FIG. 7) for the parts thereof on which parts of the circumference of the extension-stroke damping valve 80 are seated.

In the upper damping force generator 70 during the compression stroke, the high pressure in the lower oil chamber 25B passes along the inner periphery of the piston 40 and the inner and outer peripheries of the valve seat 71 and reaches the compression-stroke check valve 90 from the inner peripheral passage 80A of the extension-stroke damping valve 80. Then, the compression-stroke check valve 90 opens by overcoming the biasing force of the valve spring 91, thus allowing the oil to flow from the lower oil chamber 25B into the upper oil chamber 25A. During the extension stroke, the extension-stroke damping valve 80 is pushed open by the high pressure in the upper oil chamber 25A and undergoes deflections as the whole of it, including the inner and outer peripheries of the parts thereof not seated on the secured portions 71A of the valve seat 71. Both of the outer periphery and the inner periphery of the extension-stroke damping valve 80 open outer peripheral passages A and inner peripheral passages B between the inner periphery of the upper piece 41 and the outer periphery of the hollow pipe 22. Thus a compression-stroke damping force is generated, caused by the passage resistance in these passages A and B (see FIG. 9A).

In the front fork 10, a shock the vehicle is subjected to is lessened by absorbing it with the compression coil spring 35 and an air spring of the air chamber 28, and a vibration of the compression coil spring 35 that accompanies an absorption of the shock is suppressed by a damping action to be explained below.

(Compression Stroke)

During the compression stroke of the front fork 10, pressure in the lower oil chamber 25B rises as the inner tube 12 lowers from its extension state, and the compression-stroke check valve 90 of the upper damping force generator 70 set on the piston 40 opens as described above. As a result, the oil in the lower oil chamber 25B is transferred to the upper oil chamber 25A, and at the same time an amount of the oil equal to "a sectional area of the inner tube 12×a stroke length" moves from the lower oil chamber 25B to the oil reservoir chamber 27 through the volume compensation passages 51.

In this process, a damping force is generated, caused by the passage resistance in the passages 51.

Also during this compression stroke, the oil in the oil chamber 25 is fed through the hole 61 in the inner tube 12 and the gap 62 between the upper piece 41 and the piston 40 into the annular interspace chamber 60 between the outer tube 11 and the inner tube 12 extending with the lowering of the inner tube 12.

(Extension Stroke)

During the extension stroke of the front fork 10, a pressure in the upper oil chamber 25A rises as the inner tube 12 rises from its compression state. The oil in the upper oil chamber 25A moves to the lower oil chamber 25B by pushing open the extension-stroke damping valve 80 of the upper damping force generator 70. In this process, a damping force is generated, caused by the passage resistance in throttling passages formed between the hollow pipe 22 and the upper piece 41 along the inner and outer peripheries of the extension-stroke damping valve 80 as described above and the passage resistance that occurs as the oil in the upper oil chamber 25A exits from the orifice 52 of the hollow pipe 22 and moves to the lower oil chamber 25B by passing through the oil reservoir chamber 27 and the volume compensation passages 51 in the hollow pipe 22.

Also during this extension stroke, the amount of the oil equal to "the sectional area of the inner tube 12× the stroke length" is fed from the oil reservoir chamber 27 to the lower oil chamber 25B.

Also during this extension stroke, the oil in the annular interspace chamber 60 between the outer tube 11 and the inner tube 12 contracting with the rising of the inner tube 12 is discharged into the oil chamber 25 through the hole 61 in the inner tube 12 and the gap 62 between the upper piece 41 and the piston 40.

Accordingly, the following operational advantages are provided by the above-described embodiment:

(a) The valve seat 71, which includes the ring-shaped member 71R, has secured portions 71A and recessed portions 71B adjacent to each other along the circumference thereof. The secured portions 71A, together with parts of the circumference of the annular-shaped extension-stroke damping valve 80 seated thereon, are secured to the piston 40, and the recessed portions 71B are spaced apart from the other parts of the circumference of the extension-stroke damping valve 80. The extension-stroke damping valve 80 undergoes deflections with the boundaries 71C between secured portions 71A and recessed portions 71B of the valve seat 71 as supporting points K, and the inner and outer peripheries of the extension-stroke damping valve 80 are disposed on the outside of line segments each connecting two circumferentially adjacent supporting points K, K of the valve seat 71.

Therefore, the extension-stroke damping valve 80 under the high pressure in one of the oil chambers (the upper oil chamber 25A in this embodiment) undergoes deflections with the boundaries 71C between secured portions 71A and recessed portions 71B of the valve seat 71 as supporting points K, so that the whole of the extension-stroke damping valve 80, including the inner and outer peripheries of the parts not seated on the valve seat 71, is pushed open. As a result, the deflections (bending) of the extension-stroke damping valve 80 can be made larger. At the same time, the oil in the high-pressure oil chamber (the upper oil chamber 25A in this embodiment) can be led out with reduced passage resistance as it passes through wider passages opened along both the outer periphery and inner periphery of the extension-stroke damping valve 80. This will weaken the damping force of the extension-stroke damping valve 80. Moreover, it will widen an adjustable range of a damping force.

(b) The secured portions 71A of the valve seat 71 have flat surfaces F for their parts on which parts of the circumference of the extension-stroke damping valve 80 are seated. As a result, the extension-stroke damping valve 80, together with the flat secured portions 71A of the valve seat 71, is secured stably to the piston 40. Further, as the extension-stroke damping valve 80 undergoes deflections, these deflections are stably defined within the boundaries 71C at either edge of the flat secured portions 71A of the valve seat 71 as supporting points K.

(c) The above-cited (a) and (b) advantageous effects can be produced by the extension-stroke damping valve 80 and the compression-stroke check valve 90 of the upper damping force generator 70 installed on the front fork 10.

Figure 10:
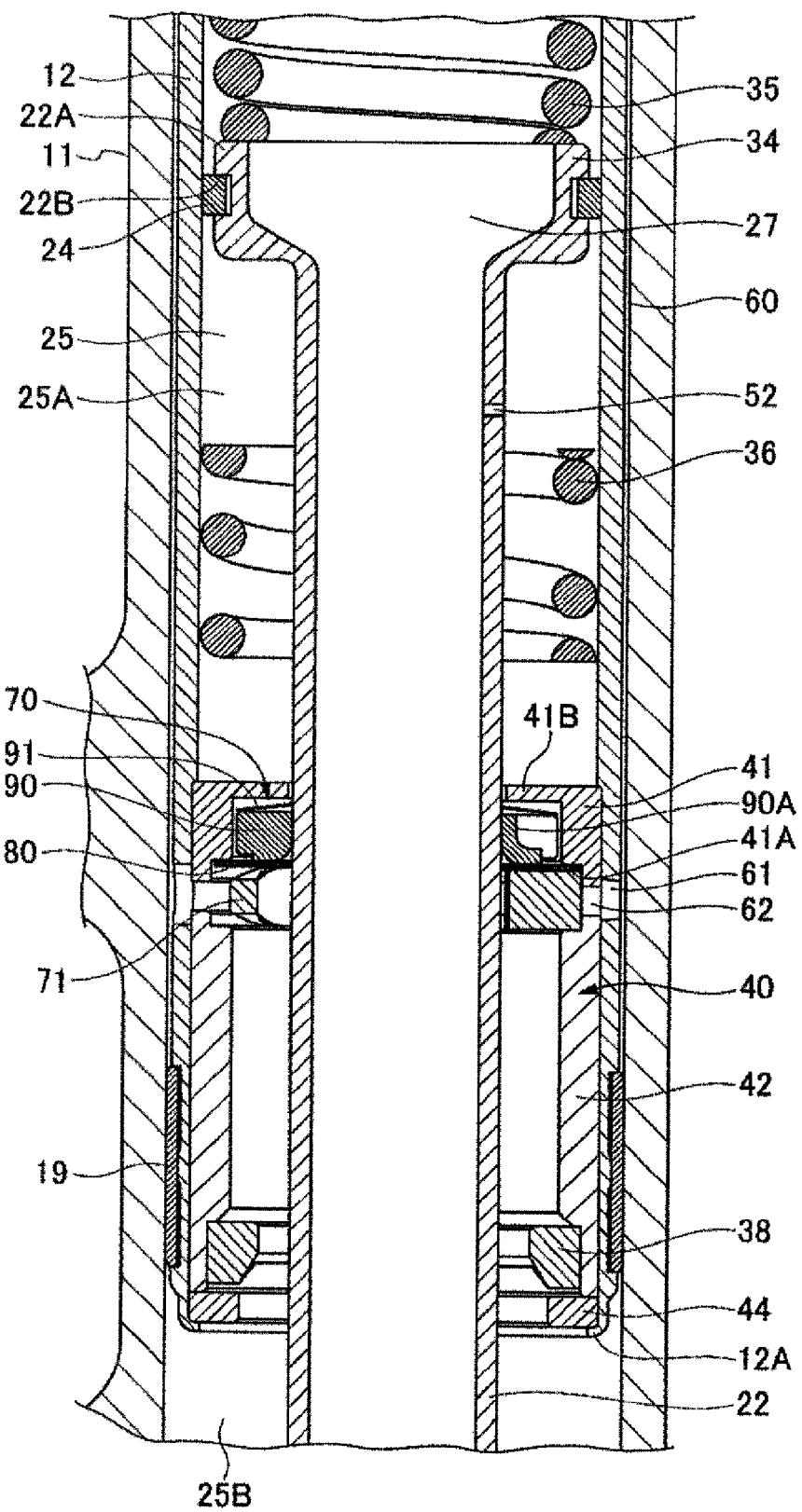
FIG. 10 is a cross-sectional view showing a main part of a front fork according to a second embodiment.
Figure 11:
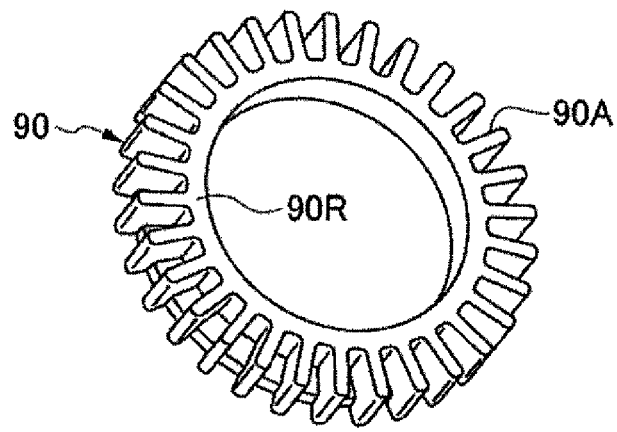
FIG. 11 shows a check valve, A being a perspective view, B being a plan view, and C being a side view.
Figure 11:
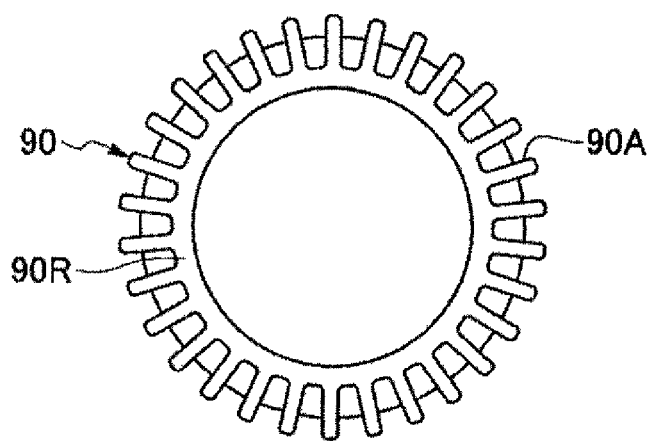
Figure 11:
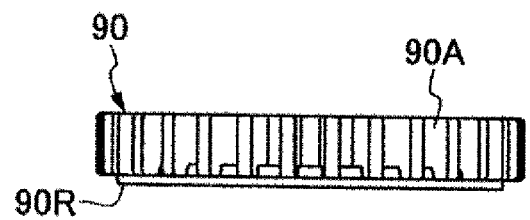

(Second Embodiment) (FIG. 10, FIG. 11)

A second embodiment as illustrated in FIG. 10 and FIG. 11 differs from the first embodiment shown in FIGS. 1 to 9 in that the ring-shaped member 90R of the compression-stroke check valve 90 is provided with slit passages 90A through which the oil flows from the upper oil chamber 25A to the lower oil chamber 25B during the extension stroke.

In this embodiment, a large number of slit passages 90A are formed at a plurality of circumferential positions at fixed intervals in the outer periphery of the ring-shaped member 90R of the compression-stroke check valve 90 where the compression-stroke check valve 90 is not seated on the upper surface of the inner periphery of the extension-stroke damping valve 80.

According to this embodiment, a damping force with a linear-proportional characteristic caused by the passage resistance in the slit passages 90A may be obtained via the process of the oil in the upper oil chamber 25A pushing open the extension-stroke damping valve 80 by flowing through the slit passages 90A of the compression-stroke check valve 90 during the extension stroke.

Figure 12:
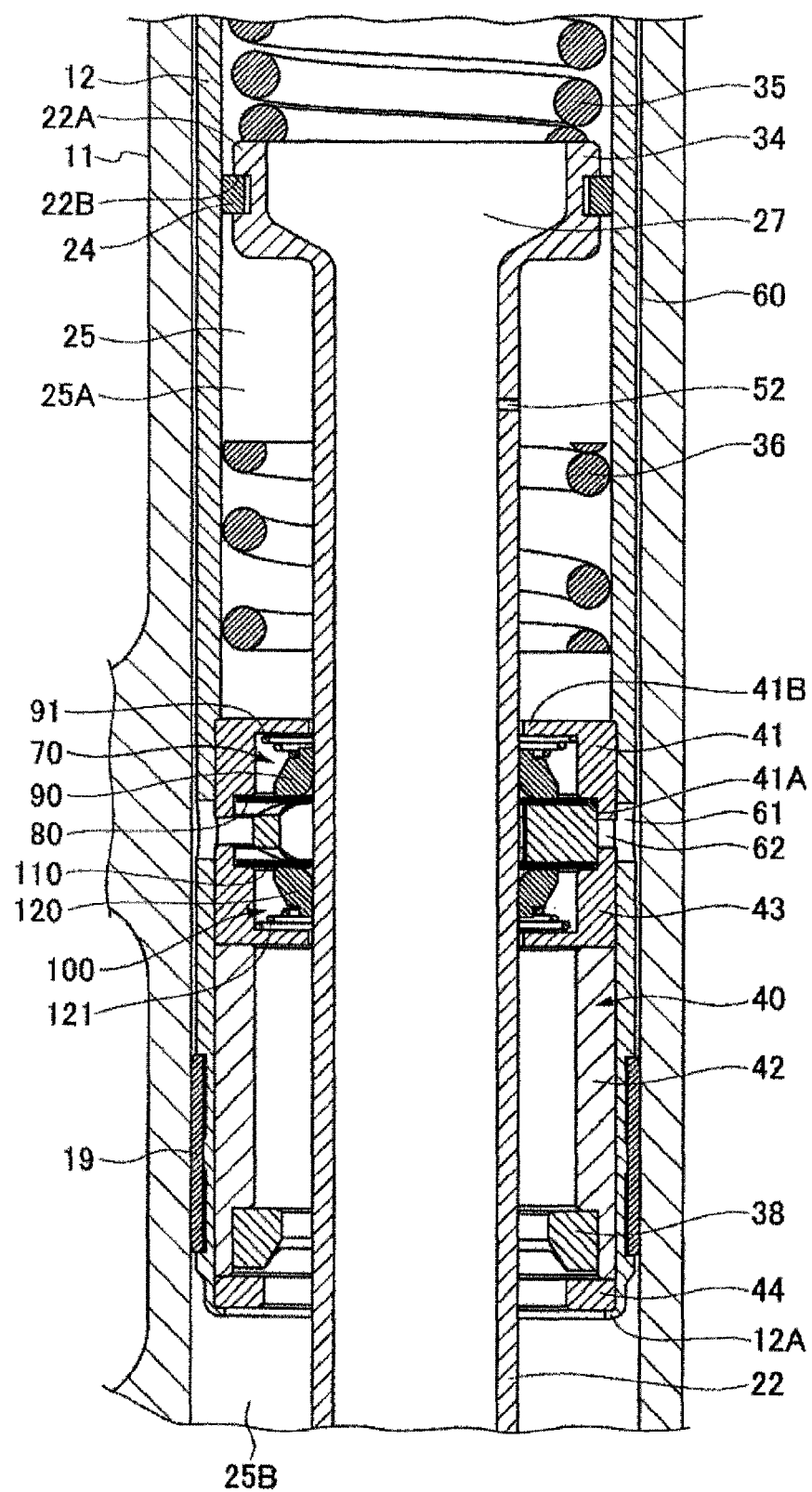
FIG. 12 is a cross-sectional view showing a main part of a front fork according to a third embodiment.
Figure 13:
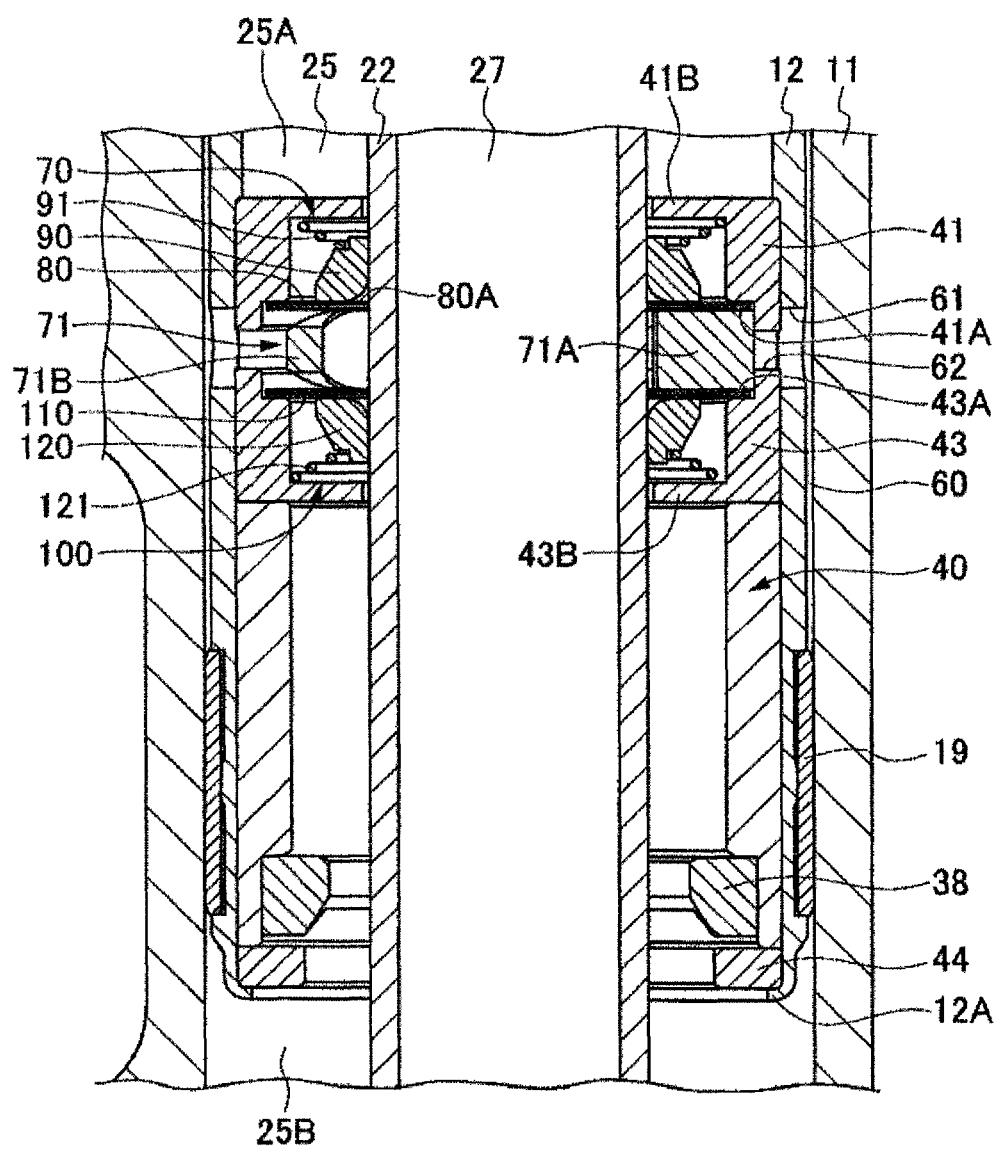
FIG. 13 is a cross-sectional view showing a damping force generator.

(Third Embodiment) (FIG. 12, FIG. 13)

A third embodiment as illustrated in FIG. 12 and FIG. 13 differs from the first embodiment shown in FIGS. 1 to 9 in that a lower damping force generator 100 is also provided. The lower damping force generator 100 is disposed between the lower oil chamber 25B and the upper oil chamber 25A around the hollow pipe 22 (and the holes 61 formed in the inner tube 12 and communicating with the annular interspace chamber 60). The lower damping force generator 100 allows the oil to flow into the lower oil chamber 25B during the extension stroke and creates a passage resistance to the oil flowing out of the lower oil chamber 25B during the compression stroke.

The lower damping force generator 100, which shares the valve seat 71 of the first embodiment, has a compression-stroke damping valve 110, an extension-stroke check valve 120, and a valve spring 121 stacked in this order on the lower oil chamber 25B side of the valve seat 71 secured to the piston 40. The lower damping force generator 100 generates a compression-stroke damping force by pushing open the compression-stroke damping valve 110 under a high pressure in the lower oil chamber 25B during the compression stroke and pushes open the extension-stroke check valve 120 under a high pressure in the upper oil chamber 25A during the extension stroke.

In the lower damping force generator 100, the compression-stroke damping valve 110 may be identical to the extension-stroke damping valve 80 of the upper damping force generator 70, and the extension-stroke check valve 120 and the valve spring 121 to be used may be identical to the compression-stroke check valve 90 and the valve spring 91 of the upper damping force generator 70. The top and bottom secured portions 71A and the top and bottom recessed portions 71B of the valve seat 71 are axisymmetric to each other with respect to a center line 71L running along the thickness center of the valve seat 71 (see FIG. 5C). Accordingly, when the upper damping force generator 70 and the lower damping force generator 100 are set in the piston 40, the extension-stroke damping valve 80, compression-stroke check valve 90, and valve spring 91 of the upper damping force generator 70 and the compression-stroke damping valve 110, extension-stroke check valve 120, and valve spring 121 of the lower damping force generator 100 are axisymmetric to each other with respect to the center line 71L of the valve seat 71.

It is to be noted that the upper damping force generator 70 and the lower damping force generator 100 are set in such a manner that they are held between the upper piece 41 and a middle piece 43 of the piston 40. Parts of the circumference of the outer periphery of the extension-stroke damping valve 80 and the compression-stroke damping valve 110, together with the outer periphery of the secured portions 71A of the valve seat 71, are sandwiched between the upper piece 41 and the middle piece 43 of the piston 40, and the outer periphery of these parts of the circumference is sandwiched between a stepped seating surface 41A of an upper piece 41 and the stepped seating surface 43A of the middle piece 43. In this state, the other parts of the circumference of the upper surface of the outer peripheral portion of the extension-stroke damping valve 80 and the other parts of the circumference of the lower surface of the outer peripheral portion of the compression-stroke damping valve 110 can come into and out of contact with the stepped seating surface 41A of the upper piece 41 and the stepped seating surface 43A of the middle piece 43, respectively. The middle piece 43 is provided with an inner peripheral stopper 43B for the valve spring 121.

Thus, the lower damping force generator 100 has the valve seat 71 secured to the piston 40 and the compression-stroke damping valve 110 and the extension-stroke check valve 120 stacked in this order on the lower oil chamber 25B side of the valve seat 71. The high pressure in the lower oil chamber 25B pushes open the compression-stroke damping valve 110 to generate the compression-stroke damping force, and the high pressure in the upper oil chamber 25A pushes open the extension-stroke check valve 120. Further, the ring-like valve seat 71 has secured portions 71A and recessed portions 71B adjacent to each other along the circumference thereof. The secured portions 71A, together with parts of the circumference of the annular-shaped compression-stroke damping valve 110 seated thereon, are secured to the piston 40, and the recessed portions 71B are spaced apart from the other parts of the circumference of the compression-stroke damping valve 110. The compression-stroke damping valve 110 undergoes deflections with the boundaries 71C between secured portions 71A and recessed portions 71B of the valve seat 71 as supporting points K, and the whole of the compression-stroke damping valve 110, including the inner and outer peripheries thereof, are disposed on the outside of the line segments L each connecting two circumferentially adjacent supporting points K, K of the valve seat 71.

Therefore, according to this embodiment, the advantageous effects substantially identical to the above-cited (a) and (b) advantageous effects can be produced by the compression-stroke damping valve 110 and the extension-stroke check valve 120 of the lower damping force generator 100.

Up to this point, the preferred embodiments of the present invention have been described in detail by referring to the drawings. However, the invention is not limited to those specific embodiments. It will be understood by those skilled in the art that various modifications and variations in design may be made thereto without departing from the scope of the invention, and all such modifications are also intended to fall within the scope of the invention.

The present invention provides a damping force generator for a hydraulic shock absorber which includes a piston providing a partition between two oil chambers, a valve seat secured to the piston, a damping valve disposed on one side of the valve seat, and a check valve stacked on the damping valve such that a high pressure in one of the oil chambers pushes open the damping valve to generate a damping force and a high pressure in the other of the oil chambers pushes open the check valve. The ring-like valve seat has secured portions and recessed portions adjacent to each other along a circumference thereof. The secured portions, together with parts of the circumference of the annular-shaped damping valve seated thereon, are secured to the piston, and the recessed portions are spaced apart from the other parts of the circumference of the damping valve. The damping valve undergoes deflections with the boundaries between secured portions and recessed portions of the valve seat as supporting points, and inner and outer peripheries of the damping valve are disposed on an outside of line segments each connecting two circumferentially adjacent supporting points of the valve seat. As a result, the damping force generator for the hydraulic shock absorber features a wider adjustable range of a damping force by increasing an amount of deflection (bending) of the damping valve.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the present invention include such modifications and variations as come with the scope of the appended claims and their equivalents.

What is claimed is:

1. A damping force generator for a hydraulic shock absorber comprising:
    a piston providing a partition between two oil chambers;
    a valve seat secured to the piston;
    a damping valve disposed on one side of the valve seat; and
    a check valve stacked on the damping valve such that a high pressure in one of the oil chambers pushes open the damping valve to generate a damping force and a high pressure in the other of the oil chambers pushes open the check valve, wherein the valve seat has secured portions and recessed portions adjacent to each other along a circumference thereof, the secured portions, together with parts of a circumference of the damping valve seated thereon, being secured to the piston and the recessed portions being spaced apart from the other parts of the circumference of the damping valve, and
    the damping valve undergoes deflections with the boundary between the secured portion and the recessed portion of the valve seat as a supporting point, and inner and outer peripheries of the damping valve are disposed on an outside of line segments each connecting two circumferentially adjacent supporting points of the valve seat.

2. The damping force generator for a hydraulic shock absorber according to claim 1, wherein the secured portions of the valve seat have flat surfaces for the parts thereof on which parts of the circumference of the damping valve are seated.

3. The damping force generator for a hydraulic shock absorber according to claim 1, wherein the check valve is provided with slit passages through which the oil flows from one of the oil chambers to the other.

4. The damping force generator for a hydraulic shock absorber according to claim 2, wherein the check valve is provided with slit passages through which the oil flows from one of the oil chambers to the other.

5. A front fork comprising:
an outer tube mounted on a wheel side;
an inner tube mounted on a vehicle body side and slidably inserted in the outer tube;
a hollow pipe installed upright at a bottom inside the outer tube and having a bulkhead portion in slidable contact with an inner periphery of the inner tube;
a piston provided inside an end portion of the inner tube, wherein the piston advances and retracts through an oil chamber provided around the hollow pipe, comparting the oil chamber into an upper oil chamber thereabove and a lower oil chamber therebelow, wherein an interior of the hollow pipe defines an oil reservoir chamber that reaches to the upper part of the inner tube, and an air chamber is located above the oil pooling chamber, wherein an annular interspace chamber is located between the outer tube and the inner tube between a slide guide secured to the inner periphery of the outer tube and a slide guide secured to the outer periphery of the inner tube, and wherein holes are formed in the inner tube to communicate the annular interspace chamber with the oil chamber around the hollow pipe; and
an upper damping force generator disposed between the upper oil chamber and the lower oil chamber around the hollow pipe to allow the oil to flow into the upper oil chamber in a compression stroke and give a passage resistance to the oil flowing out of the upper oil chamber in an extension stroke, wherein the upper damping force generator includes:
a valve seat secured to the piston,
an extension-stroke damping valve disposed on an upper oil chamber side of the valve seat; and
a compression-stroke check valve stacked on the extension-stroke damping valve such that a high pressure in the upper oil chamber pushes open the extension-stroke damping valve to generate an extension-stroke damping force and a high pressure in the lower oil chamber pushes open the compression-stroke check valve, wherein the valve seat has secured portions and recessed portions adjacent to each other along the circumference thereof, the secured portions, together with parts of a circumference of the extension-stroke damping valve seated thereon, being secured to the piston and the recessed portions being spaced apart from the other parts of a circumference of the extension-stroke damping valve, and wherein the extension-stroke damping valve undergoes deflections with a boundary between the secured portion and the recessed portion of the valve seat as a supporting point, and the inner and outer peripheries of the extension-stroke damping valve are disposed on an outside of line segments each connecting two circumferentially adjacent supporting points of the valve seat.

6. A front fork according to claim 4, further comprising a lower damping force generator disposed between the lower oil chamber and the upper oil chamber around the hollow pipe to allow the oil to flow into the lower oil chamber in the extension stroke and create a passage resistance to the oil flowing out of the lower oil chamber in the compression stroke,
wherein the lower damping force generator includes:
the valve seat secured to the piston,
a compression-stroke damping valve disposed on the lower oil chamber side of the valve seat; and
an extension-stroke check valve stacked on the compression-stroke damping valve such that a high pressure in the lower oil chamber pushes open the compression-stroke damping valve to generate a compression-stroke damping force and a high pressure in the upper oil chamber pushes open the extension-stroke check valve, wherein the ring-like valve seat has secured portions and recessed portions adjacent to each other along the circumference thereof, the secured portions, together with parts of a circumference of the compression-stroke damping valve seated thereon, being secured to the piston and the recessed portions being spaced apart from the other parts of a circumference of the compression-stroke damping valve, and wherein the compression-stroke damping valve undergoes deflections with boundaries between secured portions and recessed portions of the valve seat as supporting points, and inner and outer peripheries of the compression-stroke damping valve are disposed on an outside of line segments each connecting two circumferentially adjacent supporting points of the valve seat.

* * * * *